United States Patent
Kleiner et al.

[11] Patent Number: 5,862,244
[45] Date of Patent: Jan. 19, 1999

[54] SATELLITE TRAFFIC REPORTING SYSTEM AND METHODS

[75] Inventors: Norbert Kleiner, Scottsdale; Thomas Peter Emmons, Jr., Mesa; David Charles Homeyer, Gilbert, all of Ariz.

[73] Assignee: Motorola, Inc., Schaumburg, Ill.

[21] Appl. No.: 502,039

[22] Filed: Jul. 13, 1995

[51] Int. Cl.$^6$ .................................................. G06K 9/64

[52] U.S. Cl. ......................... 382/104; 340/934; 348/149; 701/118

[58] Field of Search ................................. 382/104, 209, 382/217, 218; 348/149, 144, 117; 364/436, 437, 438; 340/934, 910, 915, 937; 701/117, 118, 119; 342/454, 456

[56] References Cited

U.S. PATENT DOCUMENTS

| | | | |
|---|---|---|---|
| 5,132,684 | 7/1992 | Pecker et al. | 340/905 |
| 5,134,661 | 7/1992 | Reinsch | 382/100 |
| 5,164,998 | 11/1992 | Reinsch | 382/100 |
| 5,182,555 | 1/1993 | Sumner | 340/905 |
| 5,313,200 | 5/1994 | Sone | 340/905 |
| 5,353,055 | 10/1994 | Hiramatsu | 348/145 |
| 5,379,215 | 1/1995 | Kruhoeffer et al. | 702/3 |
| 5,390,237 | 2/1995 | Hoffman, Jr. et al. | 379/88.23 |
| 5,396,429 | 3/1995 | Hanchett | 348/149 |
| 5,428,545 | 6/1995 | Maegawa et al. | 701/118 |
| 5,432,871 | 7/1995 | Novik | 382/232 |
| 5,504,683 | 4/1996 | Gurmu et al. | 701/117 |
| 5,509,082 | 4/1996 | Toyama et al. | 382/104 |
| 5,590,217 | 12/1996 | Toyama | 382/104 |

OTHER PUBLICATIONS

Becker, "Automatic Traffic Data Collection Using Aerial Video Images." 2nd Int. Conf. on Road Traffic Monitoring, pp. 79–83, Feb. 1989.

Blosseville, "TITAN: A Traffic Measurement System Using Image Processing Techniques," $2^{nd}$ Int. Conf. on Road Traffic Monitoring, pp. 84–88, Feb. 1989.

Guillen et al. "Knowledge Based System For Traffic Monitoring and Incident and Congestion Detection, Using Image Processing and Computer Vision Data." 6th Int. Conf. on Road Traffic Monitoring and Control, pp. 148–152, Apr. 1992.

*Primary Examiner*—Amelia Au
*Assistant Examiner*—Jon Chang
*Attorney, Agent, or Firm*—Harold C. McGurk; Jennifer B. Wuamett

[57] ABSTRACT

With a constellation of low-earth orbiting satellites, instantaneous photographs of all large cities can be made available in real-time or near real-time. Those photographs can be downloaded to ground stations, and there photographically interpreted to determine traffic conditions. The use of high and low photographic resolution permit making distinctions between different causes of traffic conditions. A color-coded map may be generated showing all major roads and their current status, showing such conditions as light traffic, medium traffic, heavy traffic and traffic accidents or jams, for example. These color-coded maps or color-coded alphabetized lists of streets may be broadcast to subscribers (broadcast stations, companies or individuals). From the color-coded traffic report, the subscribers are updated about which routes to avoid and what the best detours are around the more congested areas.

26 Claims, 3 Drawing Sheets

SATELLITE TRAFFIC REPORTING SYSTEM AND METHODS

TECHNICAL FIELD

This invention relates generally to remote sensing systems and methods and, in particular, to a space-based remote sensing system and methods for reporting on traffic conditions.

BACKGROUND OF THE INVENTION

A significant portion of broadcast station programming (radio and television) may be devoted for reporting on traffic conditions. In larger cities, traffic reports are broadcast frequently throughout each day of the week. As much as ten percent of a typical morning radio station programming may be devoted to traffic reporting. Some broadcast stations use traffic reporting to distinguish themselves from other broadcast stations as a way to lure listeners or viewers.

Broadcast stations currently get their information from either a central traffic clearinghouse and/or flying aircraft. The aircraft are either fixed-wing planes or helicopters that fly over particular regions of a city. There are at least two problems inherent in traffic clearinghouses and aircraft reporting. First, clearinghouses and aircraft reporting only provide traffic conditions for selected highways and streets of a city. Thus, some streets or portions of a street having heavy traffic demand may go unnoticed by the aircraft and may not be reported because of the limited broadcast time available for traffic reports. Second, aircraft traffic reports become stale more often because it may not be updated frequently enough to provide a more accurate picture of the current traffic conditions. Stale traffic reports may result in drivers entering areas experiencing heavy traffic occurring in streets and intersections not covered by the aircraft or clearinghouses. These highly congested streets could be avoided if there was some way of notifying drivers of a better route. Accordingly, there is a significant need for a system and method that would supply current traffic conditions on some or all streets including highways within a city.

DESCRIPTION OF THE PREFERRED EMBODIMENTS

A "satellite" as used throughout this description means a manmade object or vehicle intended to orbit earth. A "satellite" comprises geostationary, low-earth and medium-earth orbiting satellites and/or combinations thereof. A "constellation" means a number of satellites arranged in orbits for providing specified coverage (e.g., radio communication, remote sensing, etc.) of a portion, portions or all of earth. A constellation typically includes multiple rings (or planes) of satellites and may have an equal number of satellites in each plane, although this is not essential.

Figure 1:
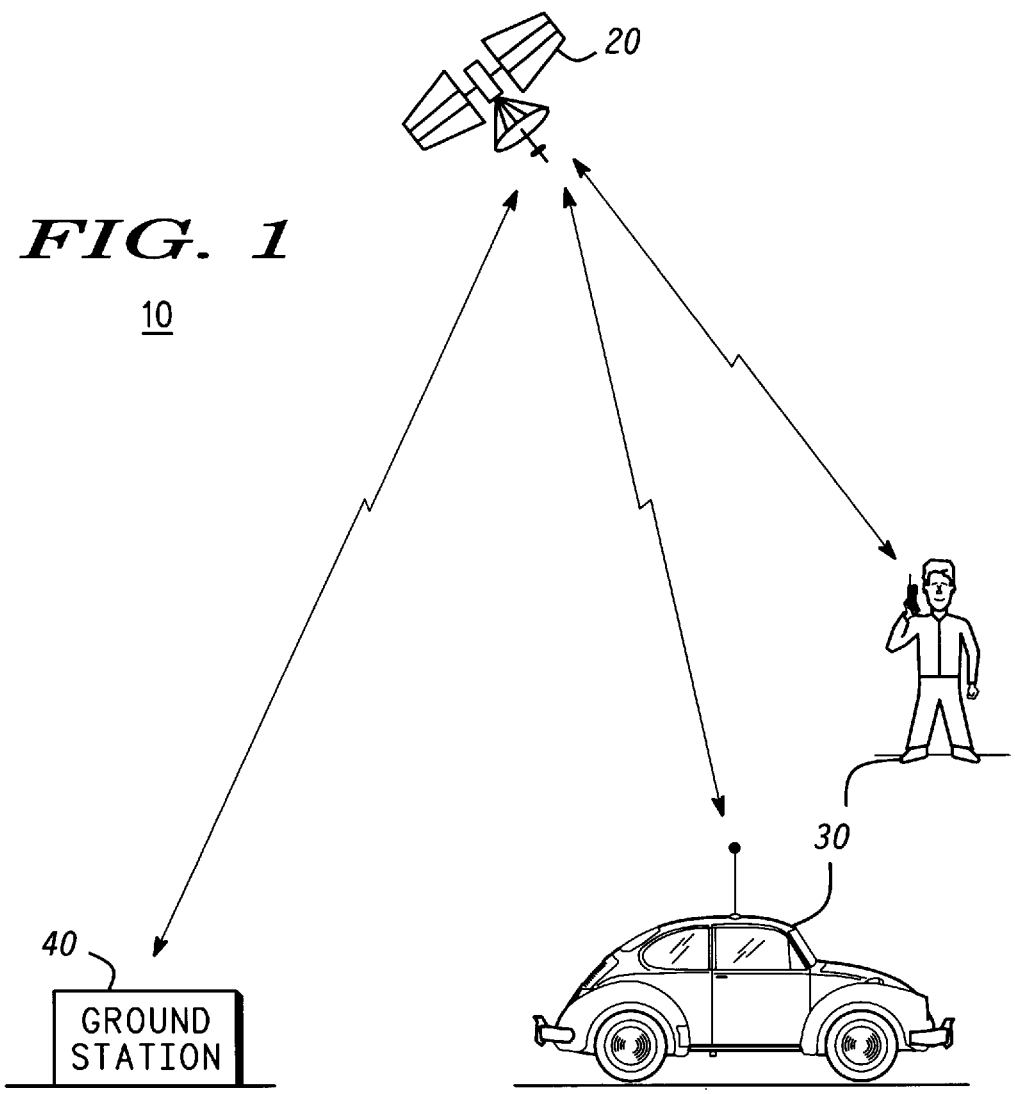
FIG. 1 shows a general view of a space-based remote sensing system according to a preferred embodiment of the present invention.

FIG. 1 shows a general view of remote sensing system 10 according to a preferred embodiment of the present invention. Although FIG. 1 illustrates a highly simplified diagram of remote sensing system 10, system 10 comprises at least one satellite 20, any number of subscriber units 30 and at least one ground station 40.

The present invention is applicable to remote sensing systems 10 having at least one satellite 20 in low-earth, medium-earth or geosynchronous orbit. Satellite 20 is preferably a satellite in low-earth orbit around earth. Satellite 20 may be a single satellite or one of many satellites in a constellation of satellites orbiting earth, like the IRIDIUMO® system. Satellite 20 communicates with other nearby or adjacent satellites 20 through cross-links. The present invention is also applicable to remote sensing systems 10 having satellites 20 which orbit earth at any angle of inclination (e.g., polar, equatorial or another orbital pattern). The present invention is applicable to systems 10 where full coverage of the earth is not achieved (i.e., where there are "holes" in the remote sensing coverage provided by the constellation) and to systems 10 where plural coverage of portions of the earth occur (i.e., more than one satellite is in view of a particular point on earth's surface).

Figure 2:
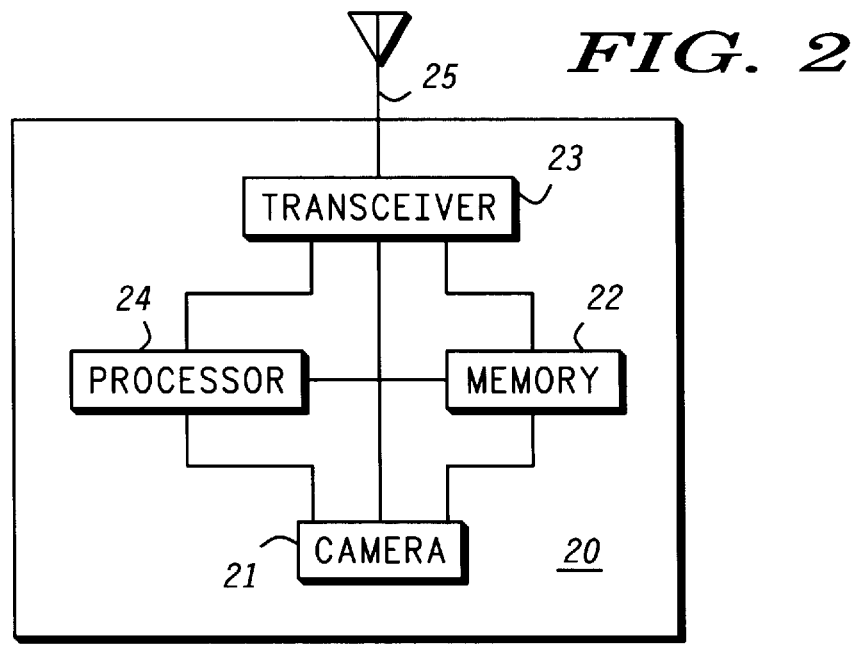
FIG. 2 shows components of a satellite for remote sensing according to a preferred embodiment of the present invention.

FIG. 2 shows components of satellite 20 according to a preferred embodiment of the present invention. Satellite 20 comprises at least the following components: camera 21, memory 22, transceiver 23, processor 24 and antenna 25. There may be other components of satellite 20 that are not shown which are necessary for operating a satellite but are not important to the present invention. These other components are well known to those of ordinary skill in the art, including for example, solar arrays and fuel propulsion systems. Moreover, there may be more than one of the components in satellite 20, such as multiple cameras 21 or processors 24, for example.

Antenna 25 of satellite 20 is coupled to transceiver 23, while camera 21, memory 22, transceiver 23 and processor 24 are intercoupled to each other. Although camera 21 is preferably manufactured by Optical Sciences Corporation and has a resolution of approximately 10 meters, other cameras or remote sensing devices may be used as well. For example, camera 21 may be a camera able to measure carbon monoxide levels, or the radiation from heat or a measurement of a degree of reflected light. Memory 22 stores images or photographs taken by camera 21 and may store traffic analysis information sent by ground station 40. Transceiver 23 is able to transmit or receive data or voice, including for example, a modem. Processor 24, via a software program, controls the operation of satellite 20 and the other components of satellite 20. Transceiver 23 transmits the images taken by camera 21 to antenna 25 where they are sent to subscriber units 30 or ground station 40. Transceiver 23 is also capable of receiving data from subscriber units 30 and/or ground station 40. Memory 22, transceiver 23, processor 24 and antenna 25 are well known to those of ordinary skill in the art.

Subscriber units 30 may be located anywhere on the surface of earth or in the atmosphere above earth. Remote sensing system 10 may accommodate any number of subscriber units 30. Subscriber units 30 are preferably communication devices capable of receiving voice and/or data (e.g., images, photographs, traffic reports) from satellites 20 and/or ground station 40. By way of example, subscriber units 30 may be a hand-held, portable radio adapted to receive transmissions from satellites 20, or they may be consoles mounted inside automobiles that are capable of receiving images from satellite 20 or ground station 40.

How subscriber units 30 physically transmit data to and receive data from satellites 20 is well known to those of ordinary skill in the art. In the preferred embodiment of the present invention, subscriber units 30 communicate with satellite 20 using a limited portion of the electromagnetic spectrum that is divided into numerous channels. The channels are preferably combinations of L-Band and/or K-Band frequency channels but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Figure 3:
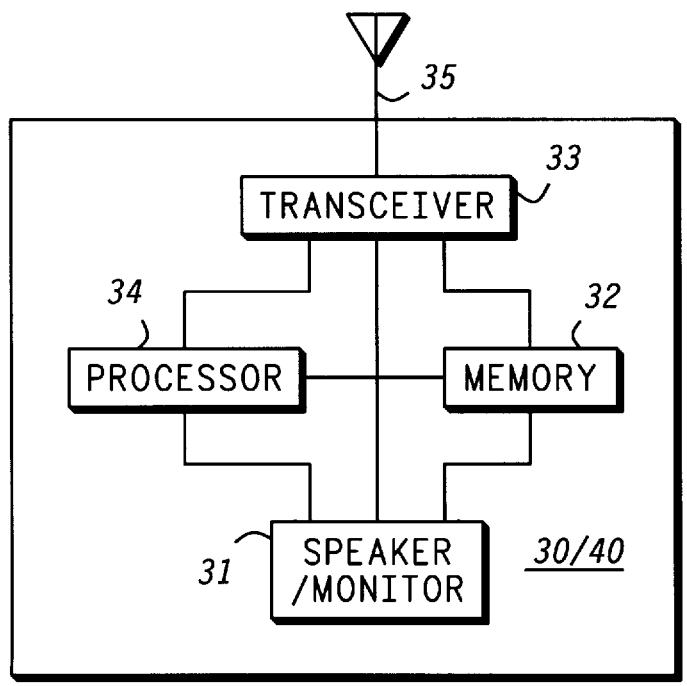
FIG. 3 shows components of a subscriber unit and/or ground station according to a preferred embodiment of the present invention.

FIG. 3 shows components of subscriber unit 30 (and ground station 40) according to a preferred embodiment of the present invention. As shown in FIG. 3, subscriber unit 30 comprises at least the following components: speaker/monitor 31, memory 32, transceiver 33, processor 34 and antenna 35. There may be other components of subscriber unit 30 which are not shown but are well known to those of ordinary skill in the art, including for example, a keypad. Moreover, there may be more than one of the components in subscriber units 30, such as multiple processors 34, for example.

Antenna 35 is coupled to transceiver 33, while speaker/monitor 31, memory 32, transceiver 33 and processor 34 are inter-coupled to each other. Speaker/monitor 31 may be a speaker for receiving voice information, a monitor for displaying images or photographs, or both. Memory 32 stores images taken by camera 21 of satellite 20 and may store traffic analysis information or images sent by ground station 40. Transceiver 33 is able to transmit and receive voice or data, and may be a modem, for example. Processor 34, via a software program, controls the operation of subscriber unit 30 and the other components of subscriber unit 30. Transceiver 33 receives voice information or data (e.g., images) from antenna 35 sent by satellite 20 or ground station 40. Transceiver 33 may also be capable of transmitting voice and/or data to satellite 20 or ground stations 40. Speaker/monitor 31, memory 32, transceiver 33, processor 34 and antenna 35 are well known to those of ordinary skill in the art.

Satellite 20 communicates with and is controlled by at least one ground station 40. Ground station 40 provides satellite control commands to satellite 20 so that it maintains its proper position in its orbit and performs other housekeeping tasks. Ground station 40 is additionally responsible for receiving data, including images or photographs, from satellite 20 where they are analyzed and interpreted by computer(s) or human(s) to report on whatever the images are being utilized for. For example, the images used for traffic reporting may be downloaded from satellite 20 to ground station 40 where they are analyzed to determine which streets are crowded and which are less congested.

FIG. 3 shows components of ground station 40 according to a preferred embodiment of the present invention. As described above, although subscriber unit 30 includes similar components shown in FIG. 3, ground station 40 includes at least these components as well. As shown in FIG. 3, ground station 40 comprises at least speaker/monitor 31, memory 32, transceiver 33, processor 34 and antenna 35. There may be other components of ground station 40 which are not shown but are well known to those of ordinary skill in the art. Moreover, there may be more than one of the components in ground station 40, such as multiple processors 34, for example.

Antenna 35 is coupled to transceiver 33, while speaker/monitor 31, memory 32, transceiver 33 and processor 34 are inter-coupled to each other. Speaker/monitor 31 may be a speaker for receiving voice information, a monitor for displaying image information, or both. Preferably, monitor 31 is capable of displaying the images sent by satellite 20. Memory 32 stores images taken by camera 21 of satellite 20, or it may store traffic analyses information sent by ground station 40 through satellite 20, or it may store traffic analysis information or images sent by ground station 40. Processor 34, via a software program, controls the operation of ground station 40 and the other components of ground station 40. Transceiver 33 receives voice information or images from antenna 35 sent by satellite 20 or subscriber unit 30. Transceiver 33 may also be capable of transmitting data and or images to satellite 20 or subscriber units 30. Speaker/monitor 31, memory 32, transceiver 33, processor 34 and antenna 35 are well known to those of ordinary skill in the art.

Figure 4:
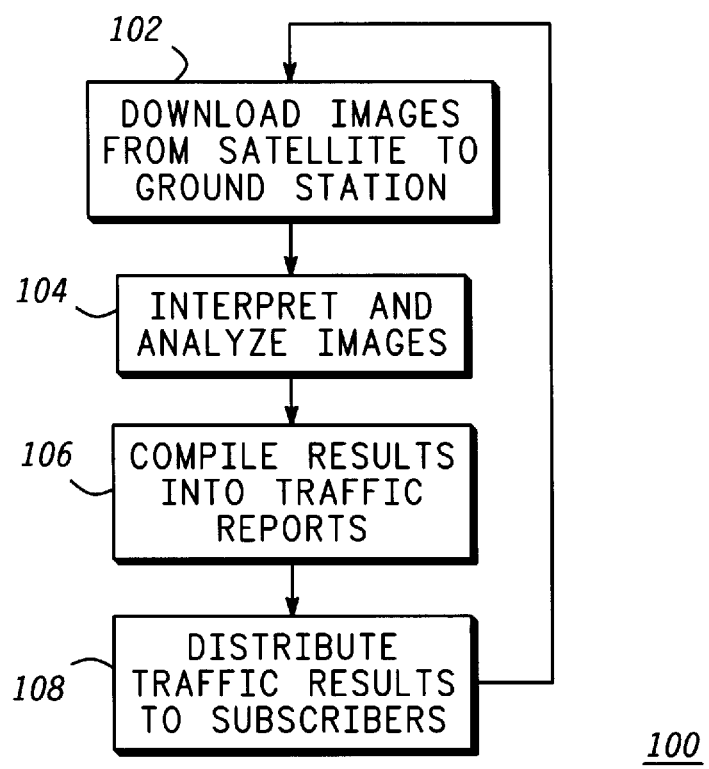
FIG. 4 shows a flowchart of a method for compiling and distributing traffic reports according to a preferred embodiment of the present invention.

FIG. 4 shows a flowchart of a method for generating traffic information or traffic reports according to a preferred embodiment of the present invention. As shown in FIG. 4, method 100 begins in step 102 by camera 21 of satellite 20 taking images, photographs or pictures (hereinafter images) of streets, roads, avenues and highways (collectively referred to as streets). These images may be taken in real-time or may occur at periodic intervals. Depending on the type of camera involved, the images may be in black and white or in color and may show the number of cars, a carbon monoxide level, a temperature reading, a radiation of heat, or a degree of reflected light. For large cities, there may be multiple images where each image shows a certain predetermined region of the city. These images may be stored in memory 22 of satellite 20, where they are eventually transmitted through transceiver 23 and antenna 25 to ground station 40, or in the alternative, to subscriber units 30.

Once antenna 35 and transceiver 33 of ground station 40 receive the images, they are subsequently stored in memory 32 of ground station 40. According to step 104 of FIG. 4, the images are displayed and interpreted either by computer (using processor 34) or humans to analyze the status of traffic on major and minor streets and generate traffic report information. The images are either viewed on monitor 31 and interpreted by humans or processed by processor 34 to determine street congestion. There are many conventional image processing algorithms that can be used to interpret street conditions and congestion. U.S. Pat. Nos. 5,164,998 and 5,134,661 both to Reinsch are examples of methods which perform image pattern analysis. Another conventional image processing algorithm or analysis may use baseline images or photographs of a street when it is empty and when the street is at specific degrees of traffic capacity (e.g., 10%, 25%, 50% and 75%, 95% of traffic capacity). By comparing the received images to these stored images, one can determine how busy the traffic is for a particular street.

The information obtained from the analysis is compiled in step 106 of FIG. 4 into a traffic report in a variety of ways. One way is to generate an alphabetized listing of streets and the current status of each street by using a color-coded scheme. For example, light traffic may be indicated by the color green, medium traffic by the color yellow, heavy traffic by the color red and a traffic accident or jam by the color black. By color-coding the name of the street with the color code representing the current traffic conditions, this list can be used to generate a traffic report for the streets in the list.

Another way is to generate a listing of streets and put a graphical representation of how crowded the street is. The graphical representation may be for example, a bar or line chart for each of the streets. The more congested the street is, the bigger the bar. The bar or line chart may or may not be color-coded according to the scheme described above.

Once the traffic conditions are analyzed in step 104 and compiled in step 106 of FIG. 4, the traffic report is distributed in step 108 to subscriber units 30. Whatever form the traffic report is, it can be distributed or broadcast by ground station 40 to subscriber units 30 or by ground station 40 through satellite 20 to subscriber unit 30. If a traffic report comprises color-coded images of a particular region and are downloaded to subscriber units 30, the users of subscriber units 40 can look at the streets and determine whether to avoid any street. The user can look at the map and determine the best route to take based on the streets having less congestion than other streets. Alternatively, subscriber unit 30 may be programmable so that a user can select an origination point and a destination point. Based on the traffic report information downloaded from satellite 20 or ground station 40, subscriber unit 30 recommends a number of routes from the origination point to the destination point where traffic is less congested. In addition, subscriber unit 30 may provide an approximate travel time on each of the recommended routes so the user can select the best route.

Another feature is that the streets taken by the user may be programmed into subscriber unit 30. Subscriber unit 30 checks the streets and gives a report to the user about the current traffic conditions on the street and which streets to avoid. The subscriber unit 30 may provide alternative routes for streets experiencing high traffic demand and an approximate travel time for each of the recommended routes.

Another way to distribute traffic information is to have a dedicated traffic reporting radio station (that is similar to the continuous weather broadcast radio channel) where traffic conditions for a particular region are continuously updated at periodic intervals. For example, in a city having five regions, the first two minutes of a ten minute periodic interval may broadcast the conditions of the first region, followed by a two minute status update for streets in the each of the second, third and fourth regions, finally until the last two minutes updates user on the traffic conditions of the fifth region. The conditions for each particular region would thus be updated every ten minutes.

It will be appreciated by those skilled in the art that the present invention provides a system and methods which overcome the deficiencies of conventional traffic reporting systems, including the limited viewing and latency by providing almost instantaneous traffic coverage. Accordingly, it is intended by the appended claims to cover all modifications of the invention which fall within the true spirit and scope of the invention. For example, instead of ground station 40 receiving, analyzing and compiling the results, subscriber unit 30 may also have the same capabilities as ground station 40 to perform image analysis and generate a traffic report. Moreover, since a highway and a street may cover many miles, a traffic report can be generated for specific areas of a highway or street or a traffic report may comprise traffic conditions for segments of predetermined distances, such as every five miles, for example. The present invention applies to other applications where instantaneous reports are required. For example, the system and method is applicable to assisting police, fire and rescue in mapping the fastest route to the scene of an emergency, helping taxi drivers find alternative routes. Finally, the system and method can be used in flood reporting, pollution reporting, disaster assessment, forest ire spotting and location of fish for fishermen.

What is claimed is:

1. A method for compiling and distributing traffic reports, comprising the steps of:

a) downloading images taken by a satellite to a ground station;
   b) analyzing the images to determine traffic congestion and comparing the images to previously stored images to determine a percentage of traffic congestion;
   c) compiling traffic reports from the analysis of traffic congestion performed in step (b); and
   d) distributing the traffic reports to subscriber units.

2. A method as recited in claim 1, wherein step (a) comprises the steps of:
   a1) the satellite taking the images using a camera;
   a2) the satellite storing the images; and
   a3) the satellite transmitting the images to the ground station.

3. A method as recited in claim 1, wherein step (b) comprises the step of executing an image processing algorithm to determine the traffic congestion.

4. A method as recited in claim 1, wherein step (b) comprises the step of executing an image processing algorithm to determine the traffic congestion for some of a plurality of streets shown in the images.

5. A method as recited in claim 1, wherein step (d) includes the step of directly transmitting the traffic reports to the subscriber units.

6. A method as recited in claim 1, wherein step (d) includes the step of transmitting the traffic reports to the satellite where the satellite transmits the traffic reports to the subscriber units.

7. A method for compiling and distributing traffic reports, comprising the steps of:

a) downloading images taken by a satellite to a ground station;
   b) analyzing the images to determine traffic congestion and comparing the images to previously stored images to determine a percentage of traffic congestion;
   c) compiling traffic reports from the analysis of traffic congestion performed in step (b) and compiling the analyses of traffic congestion into an alphabetized list of streets, each of the streets having a color-coded scheme representing a degree of congestion; and
   d) distributing the traffic reports to subscriber units.

8. A method as recited in claim 7, wherein step (c) further comprises the steps of:
   c1) using a color green to represent light traffic;
   c2) using a color yellow to represent medium traffic congestion;
   c3) using a color red to represent heavy traffic congestion; and
   c4) using a color black to represent a traffic accident or jam.

9. A method for compiling and distributing traffic reports, comprising the steps of:

a) downloading images taken by a satellite to a ground station;
   b) analyzing the images to determine traffic congestion and comparing the images to previously stored images to determine a percentage of traffic congestion;
   c) compiling traffic reports from the analysis of traffic congestion performed in step (b) and compiling the analyses of traffic congestion into an alphabetized list of streets, each of the streets having a bar graph representing a degree of congestion; and
   d) distributing the traffic reports to subscriber units.

10. A method as recited in claim 9, wherein the bar graphs are color-coded to represent different levels of traffic congestion.

11. A method for compiling and distributing results of image processing and analysis, comprising the steps of:
   a) downloading images taken by a satellite to a ground station;
   b) the ground station analyzing the images and comparing the images to previously stored images to determine a percentage of traffic congestion;
   c) the ground station compiling reports from the analysis and the comparing of the images performed in step (b); and
   d) the ground station distributing the reports to subscriber units.

12. A method for compiling and distributing traffic reports, comprising the steps of:
   a) a satellite taking images of a region on earth;
   b) the satellite downloading images satellite to a ground station;
   c) the ground station analyzing the images to determine traffic congestion by using an image processing algorithm and by comparing the images to previously stored images to determine a percentage of traffic congestion;
   d) the ground station compiling the traffic reports from results of the image processing algorithm; and
   e) the distributing the traffic reports to subscriber units.

13. A method as recited in claim 12, wherein step (e) includes the step of transmitting the traffic reports to the satellite where the satellite transmits the traffic reports to the subscriber units.

14. A traffic reporting system for compiling and distributing traffic reports, comprising:
   a satellite for taking and transmitting images;
   a ground station for receiving and analyzing the images, for comparing the images to previously stored images to determine a percentage of traffic congestion and for compiling and transmitting the traffic reports from the analyzing and comparing; and
   a plurality of subscriber units for receiving the traffic reports.

15. A traffic reporting system as recited in claim 14, wherein the satellite comprises:
   a camera for taking the images;
   memory coupled to the camera for storing the images; and
   a transceiver coupled to the memory for transmitting the images.

16. A traffic reporting system as recited in claim 14, wherein the ground station comprises:
   a transceiver for receiving the images and transmitting the traffic reports;
   memory for storing the images and the traffic reports; and
   a monitor for displaying the images.

17. A traffic reporting system as recited in claim 16, wherein the ground station further comprises a processor for executing an image processing algorithm to determine traffic congestion used for compiling the traffic reports.

18. A traffic reporting system as recited in claim 14, wherein each of the subscriber units comprise:
   a transceiver for receiving the traffic reports;
   a memory for storing the traffic reports; and
   a monitor for displaying the traffic reports.

19. A ground station comprising:
   a transceiver for receiving images taken by a satellite and transmitting traffic reports;
   a processor coupled to the transceiver for executing an image processing algorithm to analyze the images, for comparing the images to previously stored images to determine a percentage of traffic congestion and for compiling the traffic reports;
   memory coupled to the processor for storing the images and the traffic reports; and
   a monitor for displaying the images and the traffic reports.

20. A subscriber unit comprising:
   a transceiver for receiving traffic reports compiled, at least in part, by analyzing images taken by a satellite to determine traffic congestion and comparing the images to previously stored images to determine a percentage of traffic congestion;
   a memory for storing the traffic reports; and
   a monitor for displaying the traffic reports into an alphabetized list of streets, each of the streets having a color-coded scheme representing a degree of congestion.

21. A subscriber unit recited in claim 20, further comprising a processor coupled to the memory for determining best routes based on the traffic reports and selected origination and destination points.

22. A subscriber unit comprising:
   a transceiver for receiving traffic reports compiled, at least in part, by analyzing images taken by a satellite to determine traffic congestion and comparing the images to previously stored images to determine a percentage of traffic congestion;
   a memory for storing the traffic reports; and
   a monitor for displaying the traffic reports into an alphabetized list of streets, each of the streets having a bar graph representing a degree of congestion.

23. A subscriber unit comprising:
   a transceiver for receiving traffic reports compiled, at least in part, by analyzing images taken by a satellite to determine traffic congestion and comparing the images to previously stored images to determine a percentage of traffic congestion;
   a memory for storing the traffic reports; and
   a monitor for displaying the traffic reports into an alphabetized list of streets, each of the streets having a graphical representation of a degree of congestion.

24. A subscriber unit comprising:
   a transceiver for receiving traffic reports compiled, at least in part, by analyzing images taken by a satellite to determine traffic congestion and comparing the images to previously stored images to determine a percentage of traffic congestion;
   means for selecting an origination point and a destination point; and
   a monitor for displaying at least one recommended route where traffic is less congested.

25. A subscriber unit recited in claim 24, wherein the monitor further comprises means for displaying an approximate travel time on each of the at least one recommended route.

26. A subscriber unit comprising:
   a transceiver for receiving traffic reports compiled, at least in part, by analyzing images taken by a satellite to determine traffic congestion and comparing the images to previously stored images to determine a percentage of traffic congestion;
   means for selecting at least one street; and
   a monitor for displaying a current traffic condition on the selected at least one street and whether to avoid any of the at least one street.

* * * * *